(12) United States Patent
Kim

(10) Patent No.: US 6,865,654 B2
(45) Date of Patent: Mar. 8, 2005

(54) DEVICE FOR INTERFACING ASYNCHRONOUS DATA USING FIRST-IN-FIRST-OUT

(75) Inventor: Joo-seon Kim, Seongsam-si (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 233 days.

(21) Appl. No.: 10/206,952

(22) Filed: Jul. 30, 2002

(65) Prior Publication Data

US 2003/0159000 A1 Aug. 21, 2003

(30) Foreign Application Priority Data

Feb. 16, 2002 (KR) ...................................... 2002-8306 U

(51) Int. Cl.[7] .......................... G05F 12/00; G05F 13/42
(52) U.S. Cl. ....................... 711/156; 711/110; 710/310; 710/53; 710/57; 710/61
(58) Field of Search ................................. 711/110, 154, 711/156, 163; 710/52–57, 60, 61, 105, 310; 713/400, 502, 600; 709/250, 248, 237, 400; 375/220; 365/189.02, 189.04, 189.05, 233

(56) References Cited

U.S. PATENT DOCUMENTS

| | | | | |
|---|---|---|---|---|
| 5,029,124 A | * | 7/1991 | Leahy et al. ................ | 710/105 |
| 5,267,263 A | * | 11/1993 | Feezel et al. ................ | 375/220 |
| 5,572,676 A | * | 11/1996 | Ohnishi ....................... | 709/250 |
| 5,781,802 A | * | 7/1998 | Cassetti ....................... | 710/57 |
| 6,286,072 B1 | * | 9/2001 | Bredin et al. ............... | 710/305 |

* cited by examiner

Primary Examiner—Denise Tran
(74) Attorney, Agent, or Firm—Sughrue Mion, PLLC

(57) ABSTRACT

A device for interfacing asynchronous data, and more particularly, a device for interfacing asynchronous data using a first-in-first-out (FIFO) for preventing cutoff in data transfer by transferring the asynchronous data in accordance with a data transfer information signal while best satisfying a transfer request from a host between two devices that transfer the bi-directional asynchronous data. The provided device prevents control problems caused by the asynchronous data, so that the selected data is precisely and stably transferred even if the transfer speed is increased to equal that of an inner system clock. In addition, the output speed of a flag signal is faster than that of an existing method in which read and write addresses are compared, so that the remaining amount of data in the FIFO is precisely measured. As a result, asynchronous data is stably interfaced at a high speed.

12 Claims, 4 Drawing Sheets

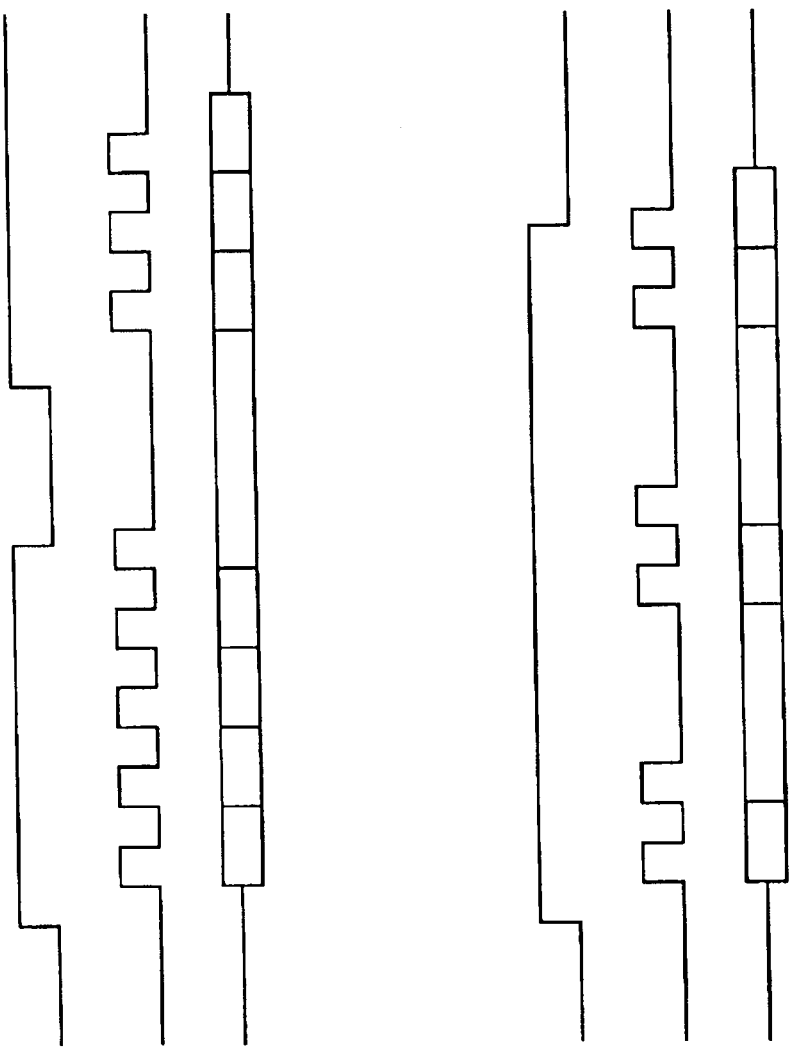

DEVICE FOR INTERFACING ASYNCHRONOUS DATA USING FIRST-IN-FIRST-OUT

BACKGROUND OF THE INVENTION

1. Field of the Invention

The present invention relates to a device for interfacing asynchronous data, and more particularly, to a device for interfacing asynchronous data using a first-in-first-out (FIFO) for preventing cutoff in data transfer by transferring the asynchronous data in accordance with a data transfer information signal while best satisfying a transfer request from a host between two devices that transfer bi-directional asynchronous data. The present application is based on Korean Patent Application No. 2002-8306, filed Feb. 16, 2002, which is incorporated herein by reference.

2. Description of the Related Art

In a digital communication or storage system, hosts may have different data processing rates for processing a communication channel or disk data, for processing error correction and error detection data, for processing a compressing or decompressing signal, and for processing information. In order to construct a digital communication or storage system using processors having different data processing rates, a device is required for thoroughly transferring or storing and restoring asynchronous data.

For transferring the asynchronous data between two devices having different data processing rates, a method for buffering a data overflow caused by the difference in the data processing rates by using an FIFO is extensively used. The FIFOs are divided into an asynchronous FIFO and a synchronous FIFO. In the asynchronous FIFO, data input and output are performed without being synchronized with a clock, so that the input data is output after a predetermined delay. In the synchronous FIFO, the data is input and output in synchronization with the clock.

As shown in FIG. 1, a conventional device for interfacing asynchronous data comprises: a host computer 110, an interface unit 120, a data buffer control unit 130, and a data buffer 140. In this case, the interface unit 120 is formed of an FIFO 120-1 and an interface control unit 120-2.

Two kinds of operation mode are defined in referring to the transfer direction of the data. An operation mode in which the data is transferred from the data buffer 140 to the host computer 110 is defined as a decoding mode, and an operation mode in which the data is transferred from the host computer 110 to the data buffer 140 is defined as an encoding mode.

First, the decoding mode will be described.

When a transfer request signal DREQ is input from the host computer 110 to the interface control unit 120-2, the interface control unit 120-2 outputs a data read request signal REQ to the data buffer control unit 130. Accordingly, when the data buffer control unit 130 generates a data buffer enable signal ACK, and the interface control unit 120-2 outputs a write signal WE to the FIFO 120-1, a data signal BDATA read out from the data buffer 140 is stored in the FIFO 120-1. When the FIFO 120-1 is not empty, namely an empty signal EMPTY is not generated in the FIFO 120-1, a read signal RE is output to the FIFO 120-1. Consequently, a data signal DATA in the FIFO 120-1 and a transfer information signal DACK are output to the host computer 110. If the empty signal EMPTY is generated by not reading out the data signal BDATA from the data buffer 140, the data and transfer information signals DATA and DACK are not output. Moreover, if a full signal FULL is generated in the FIFO 120-1, the data read request signal REQ is not output until the full signal FULL is removed. The process is iterated until the transfer request signal DREQ is eliminated.

Next, the operation in the encoding mode will be described.

The transfer request signal DREQ is output to the host computer 110. In accordance with the transfer information signal DACK input from the host computer 110, the data signal DATA is input to and stored in the FIFO 120-1 by the write signal WE from the interface control unit 120-2. When the empty signal EMPTY is not generated in the FIFO 120-1, the data read request signal REQ is output to the data buffer control unit 130. If the data buffer enable signal ACK is generated from the data buffer control unit 130, the interface control unit 120-2 outputs the read signal RE to the FIFO 120-1. Accordingly, the data signal BDATA stored in the FIFO 120-1 is output to the data buffer 140 for the data buffer to store the data signal BDATA. If the empty signal EMPTY is generated in the FIFO 120-1 by not reading out the data from the host computer 110, the interface unit 120 does not output the data signal BDATA and the data read request signal REQ. Moreover, if the full signal FULL is generated in the FIFO 120-1, the transfer request signal DREQ is not output until the full signal FULL is removed. The process is iterated until all of the desired data is input.

The described conventional device for interfacing the asynchronous data has disadvantages as follows:

First, since the interface with the host is asynchronous, direct input of an interface signal from the host computer to the interface control unit causes a synchronizing problem, so that errors may occur in the interface control unit.

Second, the asynchronous data input from the host is difficult to store appropriately in the FIFO.

Third, it is difficult to synchronize the timing for storing the asynchronous data in the FIFO with the timing for inputting the interface signal to the interface control unit.

SUMMARY OF THE INVENTION

To solve the above-described problems, it is an objective of the present invention to provide a device for interfacing asynchronous data using a first-in-first-out (FIFO) for preventing cutoff in data transfer by best satisfying a data transfer request from a host.

To accomplish the objective of the present invention, a device for interfacing asynchronous data using a first-in-first-out (FIFO) in which data transfer is performed between an external data processor and an internal data buffer, comprises a data input unit for outputting an asynchronous data transfer request signal DREQ to the external data processor in a data receipt mode, for temporarily storing and outputting the asynchronous data input from the external data processor according to a transfer information signal DACK_I of the external data processor and a write signal of the FIFO, and for generating a transfer information signal DACK_IN, which indicates the data input; a data output unit for receiving a synchronous data signal ODATA from the FIFO while receiving the asynchronous data transfer request signal DREQ in a data transfer mode, thereby outputting an asynchronous data signal DADA_O and a transfer information signal DACK_O; a FIFO for storing the data output from the data buffer and the data input unit in correspondence with a write request signal, for outputting the data in correspondence with a read request signal, and for generating state flag signals in correspondence with the remaining amount of data; and a control unit for generating a data buffer enable signal and signals for controlling read and write of the FIFO in correspondence with the transfer information signal DACK_IN and the state flag signals.

BRIEF DESCRIPTION OF THE DRAWINGS

The above objective and advantages of the present invention will become more apparent by describing in detail a preferred embodiment thereof with reference to the attached drawings in which:

FIGS. 4A through 4C illustrate interface timing of major signals in a decoding mode; and FIGS. 5A through 5C illustrate interface timing of major signals in an encoding mode.

DETAILED DESCRIPTION OF THE INVENTION

Figure 1:
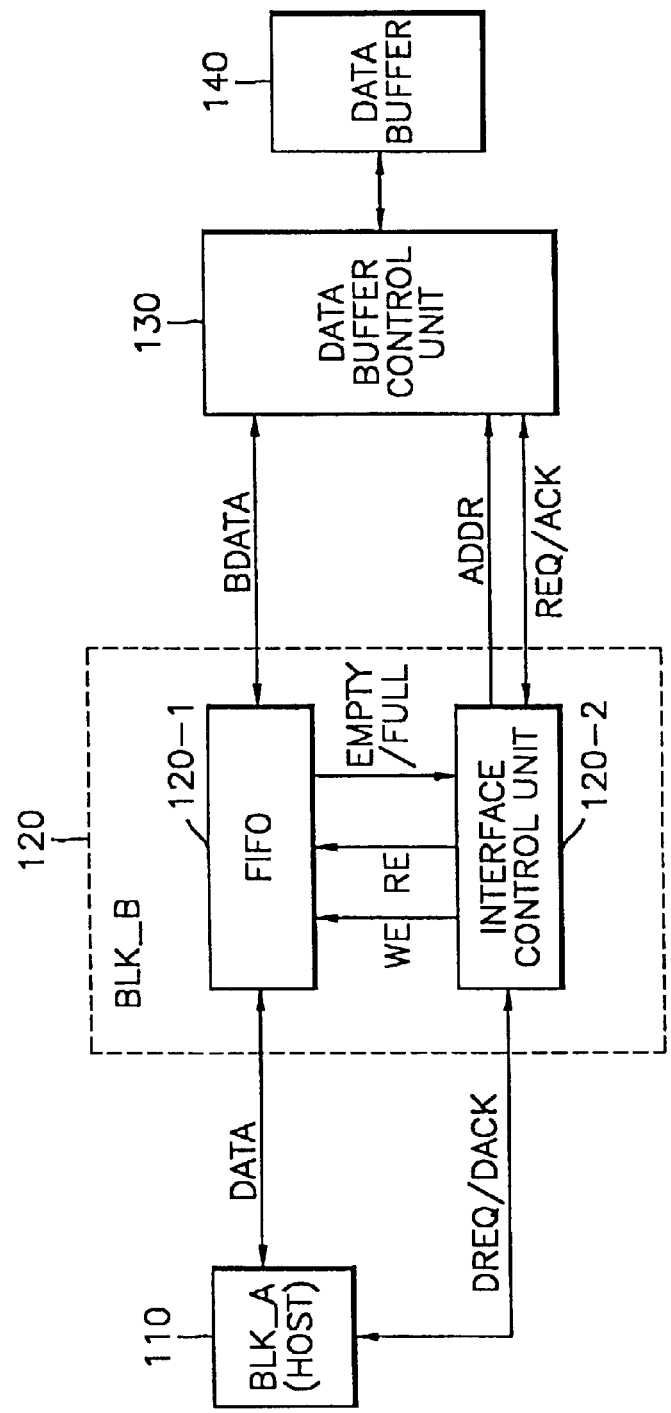
FIG. 1 is a schematic diagram of a conventional device for interfacing asynchronous data.
Figure 2:
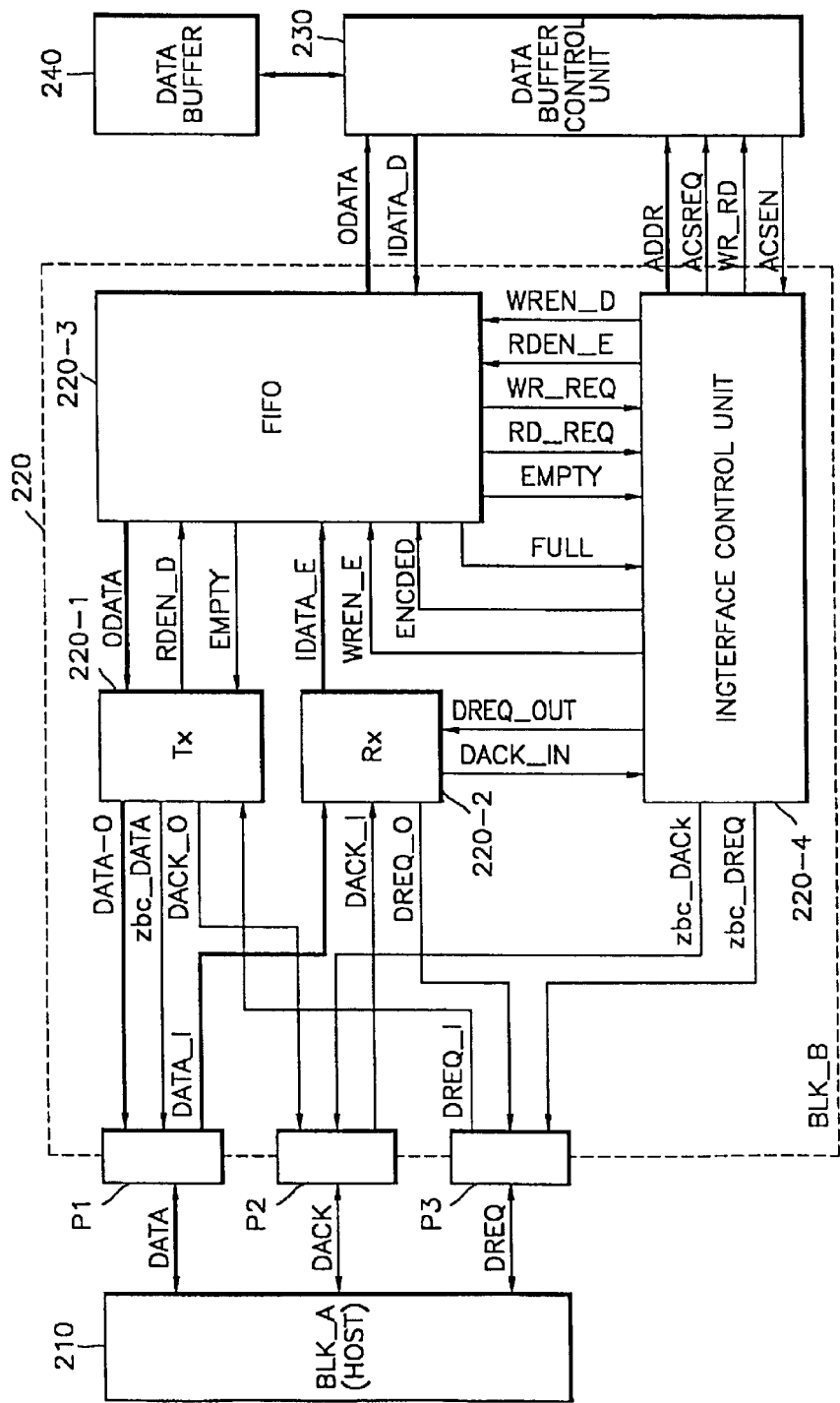
FIG. 2 is a schematic diagram of a device for interfacing asynchronous data using a first-in-first-out (FIFO) according to the present invention.

Referring to FIG. 2, a data processing system to which is applied a device for interfacing asynchronous data using a first-in-first-out (FIFO) according to the present invention, is composed of a host apparatus 210, an interface apparatus 220, a data buffer control unit 230, and a data buffer 240.

The interface apparatus 220 is formed of a data output unit 220-1, a data input unit 220-2, an FIFO 220-3, an interface control unit 220-4, and communication ports P1 through P3.

A device A, which is defined as the host apparatus 210, receives and transmits bi-directional asynchronous data, and a device B is defined as a data processor including the interface apparatus 220. A mode in which the data is transferred from the device A to the device B is referred to as an encoding mode, and a mode in which the data is transferred from the device B to the device A is referred to as a decoding mode. In each mode, the asynchronous data is transferred according to the interface timing shown in FIGS. 5A through 5C and FIGS. 4A through 4C.

The device A is the host apparatus 210 as shown in FIG. 2 or a data processor connected to a host computer, and the device B is the data processor connected to a channel such as a disk drive.

When the device A, namely the host apparatus 210, transfers an asynchronous data transfer request signal DREQ to the device B, namely the interface apparatus 220, the interface apparatus 220 synchronizes the asynchronous data with a transfer information signal DACK for transferring to the host apparatus 210. Differing from the asynchronous data transfer request signal DREQ, the transfer information signal DACK repeats high and low states HIGH and LOW. The host apparatus 210 as the device A and the interface apparatus 220 as the device B may request data transfer to each other and may transfer the data to each other in accordance with the data request. Though the interface apparatus 220 is referred to as the device B in the present invention, the interface apparatus 220 may be referred to as the device A.

The operation in the decoding mode will be described.

In the decoding mode, a system microprocessor (not shown) sets the host apparatus 210 as the device A in a data input mode, and the interface apparatus 220 as the device B in a data output mode. The host apparatus 210 as the device A transfers the data transfer request signal DREQ to the interface apparatus 220. In this case, the communication ports P1 through P3 of the interface apparatus 220 are bi-directional, and the communication ports P1 through P3 are initially set as input ports so that a transfer request apparatus can decide the directions of the communication ports P1 through P3.

The interface control unit 220-4 transfers a data buffer use request signal ACSREQ to the data buffer control unit 230 in the decoding mode. When the data buffer use request signal ACSREQ is input to the data buffer control unit 230, the data buffer control unit 230 decides whether the data buffer 240 can be used. When the data buffer 240 is usable, the data buffer control unit 230 transfers a data buffer enable signal ACSEN to the interface control unit 220-4. Then, the interface control unit 220-4 outputs an address signal ADDR in accordance with the data to be read out and a write/read state signal WR_RD as a high state, to the data buffer control unit 230. Consequently, the data buffer control unit 230 outputs a data signal IDATA_D at a memory location appointed by the read address signal ADDR, and the interface control unit 220-4 outputs a write enable signal WREN_D for storing the output data signal IDATA_D in the FIFO 220-3. The FIFO 220-3 stores the input data IDATA_D until the FIFO 220-3 is in a full state while increasing an inner counter 350 by one.

As long as the host apparatus 210 requests the data transfer, the data output unit 220-1 receives a data signal ODATA from the FIFO 220-3 and outputs an asynchronous data signal DATA_O and a transfer information signal DACK_O to the host apparatus 210. In this case, if the data transfer request signal DREQ is output, a data signal zbc_DATA is output in a low state for operating the communication port P1 as an output port. If the data transfer request signal DREQ is not output, the data signal zbc_DATA is output in a high state for operating the communication port P1 as an input port. The FIFO 220-3 generates a write request signal WR_REQ before generating an empty signal EMPTY, by considering the time from the generation of a data buffer use request signal in the data buffer 240 to the input of the data. In this case, the empty signal EMPTY is generated in correspondence with the output of all the data from the FIFO 220-3. As a result, the data is smoothly transferred.

The operation in the encoding mode will be described.

In the encoding mode, the system microprocessor sets the host apparatus 210 as the device A in the data output mode, and the interface apparatus 220 as the device B in the data input mode. The interface apparatus 220 as the device B transfers the data transfer request signal DREQ to the host apparatus 210 as the device A. In this case, the communication ports P1 through P3 that compose the interface apparatus 220 are bi-directional, and the communication ports P1 through P3 are initially set as the input ports so that the transfer request apparatus can decide the directions of the communication ports P1 through P3.

When the transfer information signal DACK is input from the host apparatus 210 to the communication port P2, the data input unit 220-2 synchronizes a data signal DATA_I, which is input from the host apparatus 210 through the communication port P1, with the transfer information signal DACK for temporarily storing the data signal DATA_I. If the transfer information signal DACK cannot be synchronized by using an inner system clock, the transfer information signal DACK is divided by an optional natural number N. Then, a signal DACK_IN, which indicates the input state of the data signal DATA_I, is transferred to the interface control unit 220-4. The interface control unit 220-4 outputs a write request signal WREN_E in correspondence with the signal DACK_IN to the FIFO 220-3 so as to store a data signal IDATA_E from the data input unit 220-2 in the FIFO 220-3. At the same time, the interface control unit 220-4 transfers the data buffer use request signal ACSREQ to the data buffer control unit 230. If the data buffer control unit 230 decides on the enable state of the data buffer 240 and transfers the data buffer enable signal ACSEN to the interface control unit 220-4, the interface control unit 220-4 outputs the address signal ADDR where the data is written and the write/read state signal WR_RD as a low state to the data buffer control unit 230. The FIFO 220-3 outputs the data signal ODATA to the data buffer control unit 230 for storing data in the data buffer 240. The FIFO 220-3 reads out and outputs the data to the data buffer control unit 230 while decreasing the inner counter 350 by one, until the FIFO 220-3 is empty. As long as the host apparatus 210 indicates the input of the data by generating the transfer information signal DACK, the data output unit 220-1 stores the input data for outputting to the FIFO 220-3. The FIFO 220-3 generates a read request signal RD_REQ for outputting the data to the data buffer 240 before generating a full signal FULL, by considering a gap between the time of outputting the data buffer use request signal ACSREQ to the data buffer control unit 230 and the time of storing the data in the data buffer 240. As a result, the data is smoothly transferred.

Figure 3:
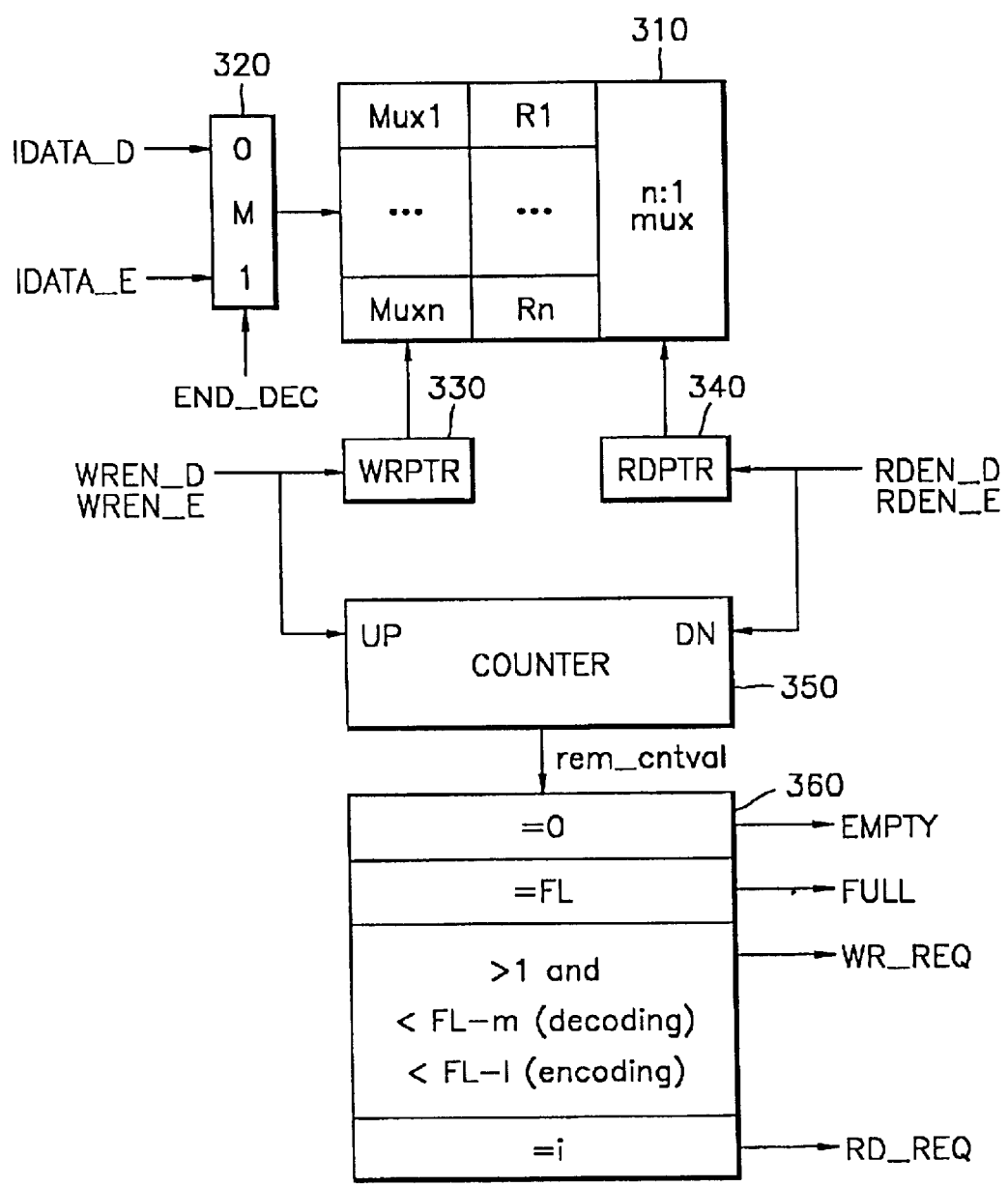
FIG. 3 is a detailed structural view of the FIFO shown in FIG. 2.

Referring to FIG. 3, the FIFO 220-3 includes storing means 310 formed of registers and multiplexers, a multiplexer 320, a write address designation unit 330, a read address designation unit 340, a counter 350, and a flag generation unit 360.

When the data is input according to write enable signals WREN and an encoding/decoding signal END_DEC is in a high state, the multiplexer 320 selects the data signal IDATA_E output from the data input unit 220-2. When the encoding/decoding signal END_DEC is in a low state, the multiplexer 320 selects the data signal IDATA_D output from the data buffer control unit 230.

When the write enable signals WREN are in a high state, the data selected from the multiplexer 320 is written in a memory device of the storing means 310, which is designated by the write address designation unit 330. When read enable signals RDEN are in a high state, the data stored in the storing means 310 designated by the read address designation unit 340 is read out. In this case, the counter 350 is increased by the write enable signals WREN, and decreased by the read enable signals RDEN. If the write and read enable signals WREN and RDEN are generated at the same time, the counter 350 maintains the current value.

The flag generation unit 360 generates flag signals for reporting the data storage state in the FIFO 220-3 according to the value of the counter 350. Namely, if the value of the counter 350 is zero, the empty flag signal EMPTY is generated to indicate that the FIFO 220-3 is empty. If the value of the counter 350 reaches a maximum value, which is the number of registers in the storing means 310, the full flag signal FULL is generated to indicate that the FIFO 220-3 is full. If the value of the counter 350 reaches a predetermined value, which is determined in consideration of a margin between zero and the maximum value for preventing cutoff of the data transfer in the encoding and decoding modes, the read or write request signal RD_REQ or WR_REQ is generated.

As described above, when the asynchronous data input request signal is generated between two devices for transferring the bi-directional asynchronous data, the devices are controlled to output the data to the data transfer request device according to the asynchronous data transfer signal. Accordingly, control problems caused by the asynchronous data are prevented, so that the selected data is precisely and stably transferred even when the transfer speed is increased to equal that of an inner system clock. In addition, the output speed of the flag signal is faster than that of a conventional method in which read/write addresses are compared, so that the remaining amount of data in the FIFO is precisely measured. As a result, an asynchronous data interface is stably performed at a high speed.

While this invention has been particularly shown and described with reference to preferred embodiments thereof, these are merely illustrative and are not intended to limit the scope of the invention. It will be understood by those skilled in the art that various changes in form and details may be made therein without departing from the spirit and scope thereof as defined by the appended claims.

What is claimed is:

1. A device for interfacing asynchronous data in which data transfer is performed between an external data processor and a data buffer, the device comprising:

a data input unit for outputting an asynchronous data transfer request signal DREQ to the external data processor in a data receipt mode, for temporarily storing and outputting the asynchronous data input from the external data processor according to a transfer information signal $DACK_{13}$ I of the external data processor and a write signal of a FIFO, and for generating a transfer information signal $DACK_{13}$ IN which indicates that the asynchronous data is input to the data input unit;

a data output unit for receiving a synchronous data signal ODATA from the FIFO while receiving the asynchronous data transfer request signal DREQ in a data transfer mode, thereby outputting an asynchronous data signal $DATA_{13}$ O and a transfer information signal $DACK_{13}$ O;

the FIFO for storing the data output from one of the data buffer and the data input unit in correspondence with a write request signal, for outputting the data output from one of the data buffer and the data input unit in correspondence with a read request signal, and for generating state flag signals in correspondence with an amount of data remaining in one of the data buffer and the data input unit; and a control unit for generating a data buffer enable signal and signals for controlling read and write of the FIFO in correspondence with the transfer information signal $DACK_{13}$ IN and the state flag signals.

2. The device of claim 1, wherein the data input unit divides the transfer information signal $DACK_{13}$ I by a predetermined constant N when the transfer information signal $DACK_{13}$ I cannot be synchronized with a system clock, and the input asynchronous data is stored after being converted into N serial input-parallel output.

3. The device of claim 2, wherein the FIFO has a data width multiplied by N when the transfer information signal is divided by the constant N in the data input unit.

4. The device of claim 1, wherein the FIFO generates the state flag signals by using counter values which are increased by one in accordance with a write request, decreased by one in accordance with a read request, and not changed when the write and read requests occur at the same time.

5. The device of claim 4, wherein the FIFO generates an empty flag signal EMPTY when the counter value is zero, generates a full flag signal FULL when the counter value is a maximum value corresponding to the maximum storage amount of the FIFO, and generates a read or write request signal when a predetermined value is between zero and the maximum value.

6. The device of claim 1, wherein the FIFO generates the write request signal before generating an empty flag signal EMPTY by outputting all of the data from the FIFO, by considering a gap between a time of a data buffer use request to the data buffer and a time of inputting the data.

7. The device of claim 1, wherein the FIFO comprises:

a multiplexer for selecting data input from the data input unit and the data buffer according to a predetermined transfer direction;

means for storing the input data selected by the multiplexer in a storage device designated by a write address signal and for outputting the data stored in the storage device designated by a read address signal;

a counter increased by one in correspondence with the write request signal and decreased by one in correspondence with the read request signal; and a flag generation unit for generating a state flag signal EMPTY, as one of the state flag signals, indicating an empty state of the FIFO, and a state flag signal FULL, as another of the state flag signals, indicating a full state of the FIFO, according to the counter value, the read request signal, and the write request signal.

8. The device of claim 7, wherein the counter maintains its current count value if the read request signal and the write request signal are simultaneously generated.

9. The device of claim 7, wherein the flag generation unit generates the state flag signal EMPTY when the counter value is zero, and the state flag signal FULL when the counter value is a maximum value corresponding to the number of registers that compose the means for storing.

10. The device of claim 1, wherein the control unit sets communication ports of the transfer request signal and the transfer information signal as input ports, in an initial state.

11. The device of claim 1, wherein communication ports are further included for transferring the data output from one of the data buffer and the data input unit, the transfer information signal, and the transfer request signal between the data input and output units and the external data processor.

12. The device of claim 11, wherein the communication ports operate as input or output ports in accordance with an input/output setting control signal.

* * * * *